(12) United States Patent
Ishida

(10) Patent No.: US 8,887,778 B2
(45) Date of Patent: Nov. 18, 2014

(54) MOTORCYCLE TIRE FOR OFF-ROAD TRAVELING

(75) Inventor: Shingo Ishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 639 days.

(21) Appl. No.: 13/186,581

(22) Filed: Jul. 20, 2011

(65) Prior Publication Data

US 2012/0024443 A1 Feb. 2, 2012

(30) Foreign Application Priority Data

Jul. 29, 2010 (JP) .................. 2010-170881

(51) Int. Cl.
- *B60C 11/13* (2006.01)
- *B60C 11/11* (2006.01)
- *B60C 11/03* (2006.01)

(52) U.S. Cl.
CPC ............. *B60C 11/11* (2013.01); *B60C 2200/10* (2013.01); *B60C 11/033* (2013.01); *B60C 11/13* (2013.01)
USPC ............. 152/209.11; 152/209.12; 152/209.18

(58) Field of Classification Search
CPC .... B60C 11/11; B60C 11/13; B60C 11/0309; B60C 11/0316; B60C 11/1315; B60C 11/1353; B60C 2200/10; B60C 2011/0383; B60C 11/03

USPC ............. 152/209.18, 209.15, 209.11, 209.12, 152/209.13, 902, 904, DIG. 1

See application file for complete search history.

(56) References Cited

U.S. PATENT DOCUMENTS

| | | | | |
|---|---|---|---|---|
| 4,619,300 A | * | 10/1986 | Tokunaga et al. | 152/209.5 |
| 2008/0245457 A1 | * | 10/2008 | Sueishi | 152/209.11 |
| 2011/0308681 A1 | * | 12/2011 | Nakamura | 152/209.18 |
| 2012/0267019 A1 | * | 10/2012 | Gatti et al. | 152/209.18 |

FOREIGN PATENT DOCUMENTS

| | | | |
|---|---|---|---|
| JP | 2007-131111 A | | 5/2007 |
| WO | WO 2011/001272 | * | 1/2011 |

* cited by examiner

*Primary Examiner* — Eric Hug

(74) *Attorney, Agent, or Firm* — Birch, Stewart, Kolasch & Birch, LLP

(57) ABSTRACT

An off-road motorcycle tire 1 having an improved cracking resistance, comprising a tread portion 2 having a plurality of blocks B, wherein at least one of the blocks B has a shallow groove 17 having a depth D1 of 10 to 50% of a height H1 of the blocks B to provide a shallowly-grooved block 16 in which the block is divided into at least two block segments 16s by the shallow groove 17, the shallow groove 17 has both ends opened on outer wall surfaces 12 of the shallowly-grooved block 16 and it has groove wall surfaces 17w extending radially inwardly from a tread surface 11 of the block and a bottom 17b connecting the groove wall surfaces 17w, and intersection portions 18 between the bottom 17b and the outer wall surfaces 12 are chamfered to form chamfered portions 19 having a convex circular arc-like curved surface.

10 Claims, 8 Drawing Sheets

MOTORCYCLE TIRE FOR OFF-ROAD TRAVELING

BACKGROUND OF THE INVENTION

The present invention relates to a motorcycle tire suitable for off-road traveling, and more particularly to an off-road motorcycle tire having an improved cracking resistance.

Motorcycle tires for traveling on unpaved roads or rough terrain, e.g., motocross tires, generally have a block type tread pattern in which a plurality of blocks are formed in a tread portion, as disclosed for example in JP-A-2007-131111. These tires having a block pattern secure a traction and a cornering force to improve the steering stability by an edge effect of the blocks biting into a soft ground such as mud or sand.

As shown in FIG. 8, for example, a block "a" of these tires may be provided with a shallow groove "b" extending in the tire circumferential direction. Such a shallow groove "b" can increase the edge of the block "a" and moreover can accelerate water drainage and removal of mud on a hard or medium hard road.

In case of such a block "a", however, a strain is easy to converge on an intersection portion "e" between a bottom surface "c" of the shallow groove "b" and an outer wall surface "d" of the block "a" and on both end portions "f" of the intersection portion "e" due to deformation of the block associated with contact and non-contact to the ground. Therefore, such a block "a" having a shallow groove "b" has a problem that cracks are easy to generate from these portions "e" and "f".

Accordingly, it is an object of the present invention to provide an off-road motorcycle tire having an improved cracking resistance.

This and other objects of the present invention will become apparent from the description hereinafter.

SUMMARY OF THE INVENTION

It has been found that the cracking resistance of blocks having a shallow groove can be improved by forming a chamfer portion having a convex circular arc-like curved surface at an intersection portion between a bottom surface of the shallow groove and an outer wall surface of the block.

In accordance with the present invention, there is provided an off-road motorcycle tire comprising a tread portion having a plurality of blocks defined by tread grooves, wherein:

at least one of said blocks has a shallow groove having a groove depth of 10 to 50% of a height of said blocks to provide a shallowly-grooved block in which the block is divided into at least two block segments by said shallow groove, said shallow groove has both ends opened on outer wall surfaces of said shallowly-grooved block, and it has groove wall surfaces extending radially inwardly from a tread surface of the block which comes into contact with a road, and a bottom connecting said groove wall surfaces, and intersection portions between said bottom and said outer wall surfaces are chamfered to form chamfered portions having a convex circular arc-like curved surface.

It is preferable that said chamfered portions have a radius of curvature of 1 to 15 mm.

The shallowly-grooved block may be provided with a notched portion which is formed in at least a part of an intersection portion between the tread surface and the block wall surfaces and which extends along a profile line of the tread surface. Preferably, the notched portion extends in a direction intersecting with the shallow groove. Preferably, the notched portion is in the form of a concave circular arc having a radius of curvature of 1 to 8 mm in a cross section perpendicular to a longitudinal direction of the notched portion.

The outer wall surface of the shallowly-grooved block may have a recessed surface which extends radially inwardly from the chamfered portion and which is recessed toward a center of the block. The depth of the recess may be gradually decreased up to zero in a direction from the top of the block toward the bottom thereof.

The tread surface of the shallowly-grooved block may be in the form of a horizontally long rectangle, when viewed from above, such that its axial width is larger than its circumferential length. In such a block, the shallow groove extends in the tire circumferential direction at a center portion of the block in a width direction. Further, the tread surface of the shallowly-grooved block may be in an approximately butterfly-like form or a wing-like form, when viewed from above, such that the circumferential length of the tread surface is gradually reduced in a direction from both axially outer sides toward an axially inner side of the tread surface.

In the specification, the "dimensions" of respective parts or portions of the tire denotes those measured under no loading in the standard state that the tire is mounted on a standard rim and inflated to a normal inner pressure, unless otherwise noted. The term "standard rim" denotes a rim defined for every tire in a standardizing system on which the tire is based and, for example, is called "standard rim" in JATMA, "Design Rim" in TRA and "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO.

The off-road motorcycle tire of the present invention comprises a tread portion provided with a plurality of blocks including at least one block having a shallow groove. Since both ends of the shallow groove open on outer wall surfaces of the shallowly-grooved block and at least one of intersection portions between a bottom surface of the shallow groove and outer wall surfaces of the block are chamfered to form a convex circular arc-like curved surface, a strain apt to converge on the intersection portions or the vicinity thereof due to deformation of the block associated with contact and non-contact to the ground can be scattered to improve the cracking resistance.

DETAILED DESCRIPTION OF THE INVENTION

An embodiment of the present invention will now be explained with reference to the accompanying drawings.

Figure 1:
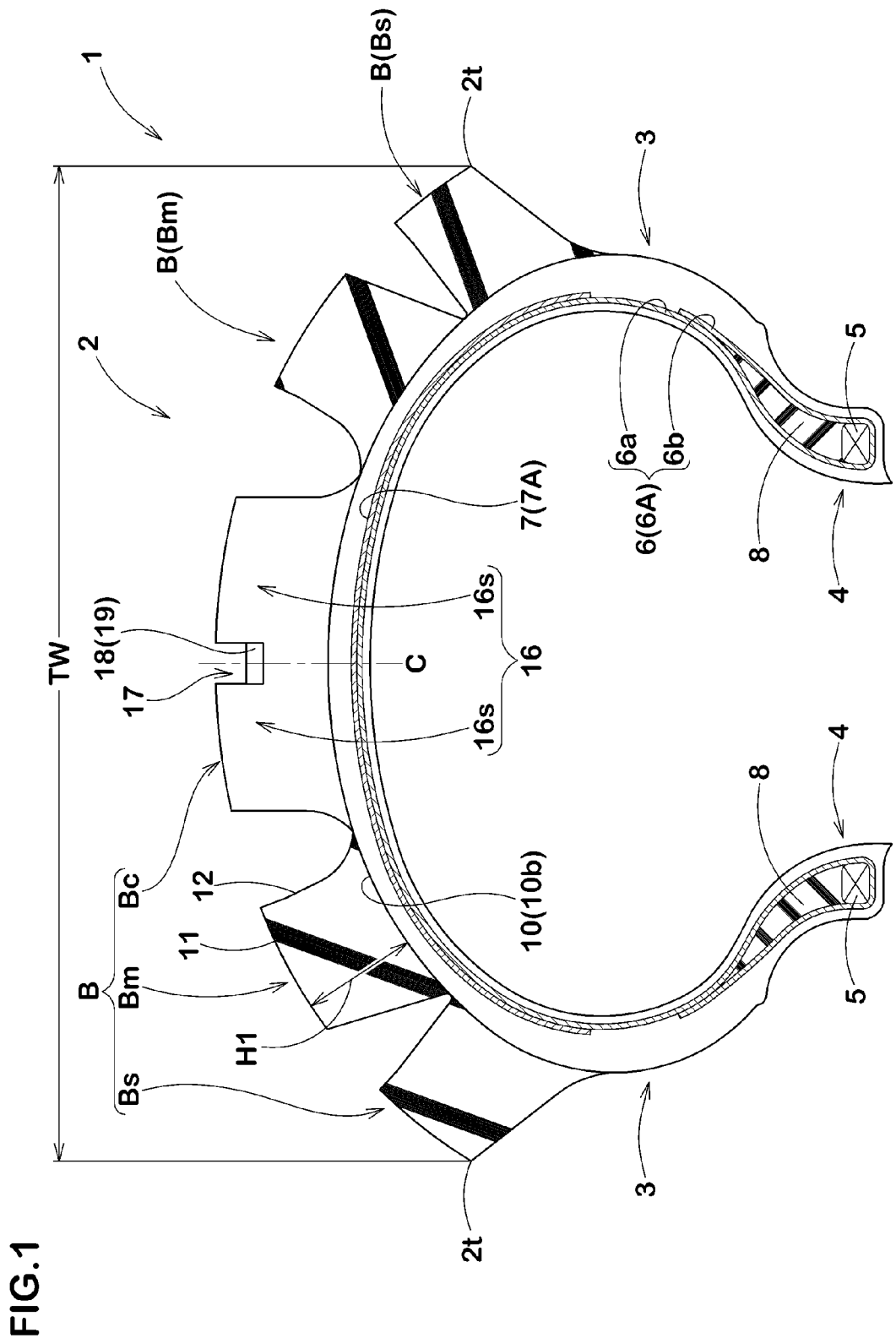
FIG. 1 is a cross sectional view of an off-road motorcycle tire illustrating an embodiment of the present invention.

In FIG. 1 is shown a motorcycle tire suitable for motocross racing as a motorcycle tire 1 for off-road traveling of the present invention. The motocross tire is designed so as to be able to exhibit maximum performances on a soft ground such as mud or sand. FIG. 1 is a cross section view taken on line A-A in FIG. 2 of the tire 1 in the standard state under no loading.

The motorcycle tire 1 in this embodiment includes a tread portion 2, a pair of sidewall portions 3, 3 extending radially inwardly from the both edges of the tread portion 2, and a pair of bead portions 4, 4 which are located at radially inner edges of the sidewall portions 3, 3 and to which a rim (not shown) is attached. The tire 1 further includes a carcass 6 that extends from the tread portion 2 to each of bead cores 5 in the bead portions 4, 4 through the sidewall portions 3, 3, and a tread-reinforcing layer 7 that is disposed radially outward of the carcass 6 in the tread portion 2.

The tread portion 2 is curved in an arc-like shape to have a radially outwardly convex profile in the transverse cross section, and a tread width TW which is an axial distance between both tread edges 2t, 2t provides the maximum width of the tire 1.

The carcass 6 comprises at least one carcass ply 6A (in case of this embodiment, a single carcass ply 6A) which comprises a main portion 6a toroidally extending between a pair of bead cores 5, 5, and turnup portions 6b that extend from both ends of the main body portion 6a and are turned up around the bead cores 5, 5 from the axially inside to the axially outside of the tire to thereby anchor the carcass ply. Between the main portion 6a and each of the turnup portions 6b of the carcass ply 6A is disposed a bead apex 8 made of a hard rubber which extends radially outwardly from the bead core 5, to thereby suitably reinforce the bead portion 4.

As a carcass ply 6A is applied, for example, a carcass ply having a radial structure in which carcass cords made of an organic fiber are arranged at an angle of, for example, 75 to 90° with respect to the circumferential direction of tire. A carcass 6 may have a bias structure in which at least two carcass plies are used and the carcass cords are obliquely arranged at an angle of, for example, 15 to 45° with respect to the circumferential direction of tire.

The tread-reinforcing layer 7 comprises at least one reinforcement ply 7A (in case of this embodiment, single ply 7A) of organic fiber cords arranged obliquely at an angle of, for example, 15 to 45° with respect to the circumferential direction of tire. The tread-reinforcing layer 7 is disposed to reinforce the tread portion 2 over an approximately overall width of the tread portion 2, thereby securing a required tread rigidity.

Figure 2:
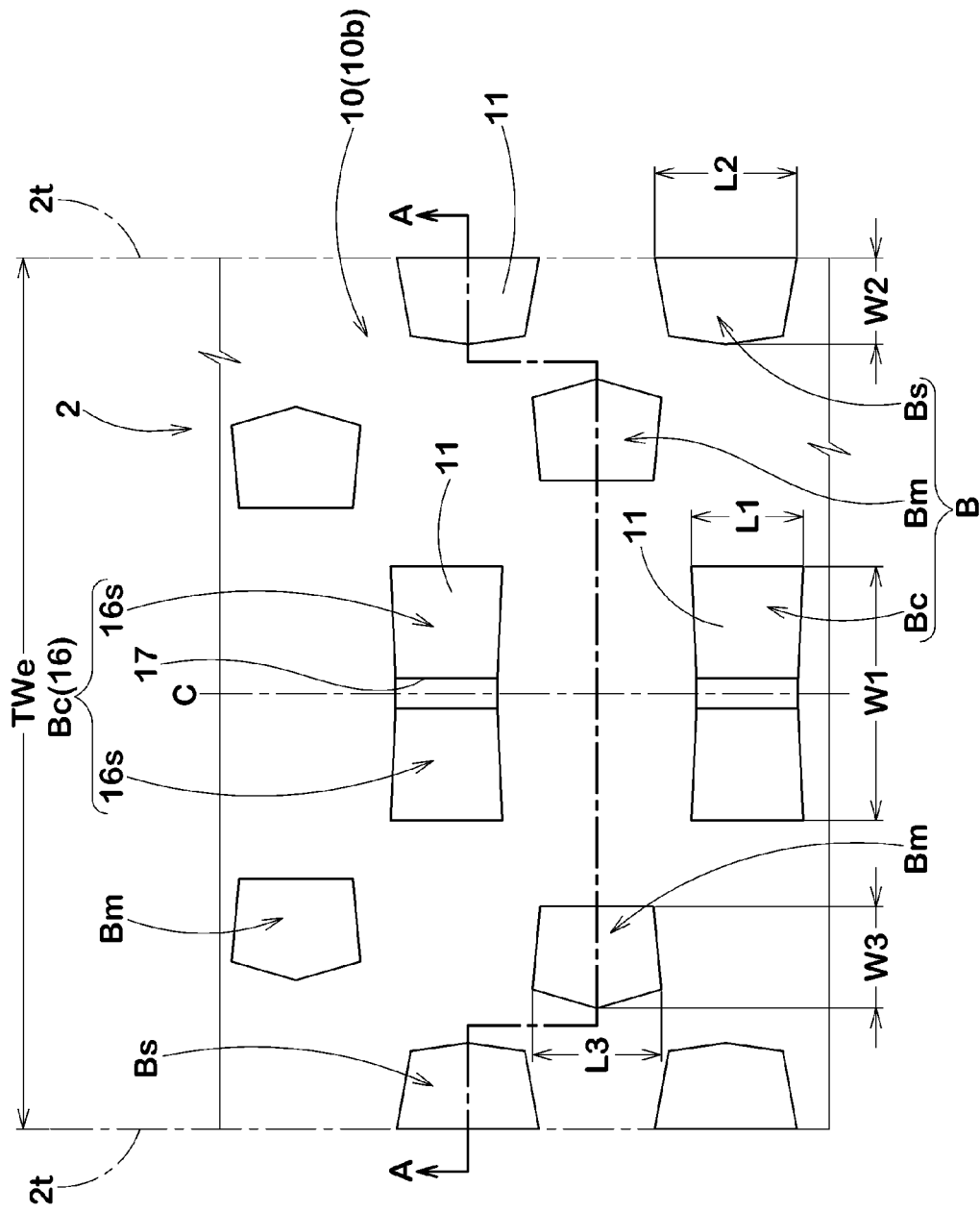
FIG. 2 is a partial development of a tread portion of the motorcycle tire of FIG. 1.

In the tread portion 2 are arranged, as shown in FIGS. 1 and 2, a plurality of blocks B defined by tread grooves 10. The tread grooves 10 are formed, for example, to have a groove bottom 10b smoothly extending along an outer surface of the carcass 6.

Each of the blocks B includes a tread surface 11 which is a top surface in the projecting direction of the block B and which comes into contact with a road, and wall surfaces 12 extending radially inwardly from peripheral edges of the tread surface 11 to the groove bottom 10b of the tread grooves 10. Block height H1 between the groove bottom 10b and the tread surface 11 is set to, for example, a range of about 5 mm to about 20 mm.

The blocks B are sparsely disposed at intervals in the circumferential and axial direction of tire. Such a sparsely distributed block arrangement can exhibit a high driving force since the blocks B deeply dig into a soft terrain such as mud. It is also useful for preventing the tread grooves 10 from clogging with mud, since the tread grooves 10 separating the blocks B are wide.

The sparse distribution arrangement of blocks B can be quantitatively defined by a land ratio Sb/S of the total surface area Sb of tread surfaces 11 of all blocks B to the whole surface area S of the outer surface of the tread portion 2 (i.e., surface area of an imaginary tread in which all tread grooves 10 are filled up). If the land ratio Sb/S is too small, the driving force on a hard road or a medium road tends to be decreased, and if the land ratio Sb/S is too large, the driving force on a soft road such as mud tends to be decreased. From such points of view, the land ratio Sb/S is preferably from 15 to 30%.

It is preferable that the blocks B have a hardness of at least 50, especially at least 70. If the rubber hardness is too small, there is a possibility that the rigidity of the blocks becomes excessively small, so the grip performance cannot be exhibited on off roads. On the other hand, if the rubber hardness is too large, there is a possibility that the block rigidity becomes excessively large, so the road-hugging property and the ride comfortability are deteriorated. From such a point of view, it is preferable that the hardness of the blocks B is at most 100, especially at most 90. The term "hardness" or "rubber hardness" as used herein means a Durometer Type A hardness measured at 23° C. according to JIS K 6253.

The blocks B shown in this embodiment include center blocks Bc disposed on the tire equator C, shoulder blocks Bs disposed along both tread edges 2t, and middle blocks Bm disposed between a row of the center blocks Bc and a row of the shoulder blocks Bs.

The center blocks Bc are formed to have a tread surface 11 having a shape such that axial width W1 of the block is larger than circumferential length L1 of the block, e.g., a horizontally long rectangle or a butterfly-like or wing-like form as shown in FIG. 2, when viewed from above. Such horizontally long center blocks Bc can enhance the traction performance in a straight running, since the edge in the axial direction is increased. It is preferable that the axial width W1 of the tread surface 11 of the center block Bc is from about 20% to about 35% of a tread-developed width TWe, and the circumferential length L1 of the tread surface 11 is from about 40% to about 65% of the axial width W1.

The tread surface 11 of the shoulder blocks Bs is formed, for example, into a circumferentially-long shape, when viewed from above, such that circumferential length L2 of the block is larger than axial width W2 of the block, as shown in FIG. 2. Such circumferentially long shoulder blocks Bs can enhance the cornering performance on a soft road, since the edge in the circumferential direction is increased. It is preferable that the axial width W2 of the tread surface 11 of the shoulder block Bs is from about 8% to about 12% of the tread-developed width TWe, and the circumferential length L2 of the tread surface 11 is from about 115% to about 165% of the axial width W2.

The tread surface 11 of the middle blocks Bm is formed, for example, into a circumferentially-long shape, when viewed from above, such that circumferential length L3 of the block is slightly larger than axial width W3 of the block, as shown in FIG. 2. Such middle blocks Bm can enhance the straight running performance and the cornering performance, since the edge in the axial direction can be increased in a balanced manner as well as the edge in the circumferential direction. It is preferable that the axial width W3 of the tread surface 11 of the middler block Bm is from about 9% to about 15% of the tread-developed width TWe, and the circumferential length L3 of the tread surface 11 is from about 90% to about 140% of the axial width W3.

These blocks Bc, Bs and Bm are staggered such that, for example, the center blocks Bc are located at circumferentially different positions from the middle blocks Bm, and the middle blocks Bm are located at circumferentially different positions from the shoulder blocks Bs. Such a staggered arrangement of the blocks is effective for obtaining a balanced traction performance over a wide range of the tread portion 2.

Figure 3A:
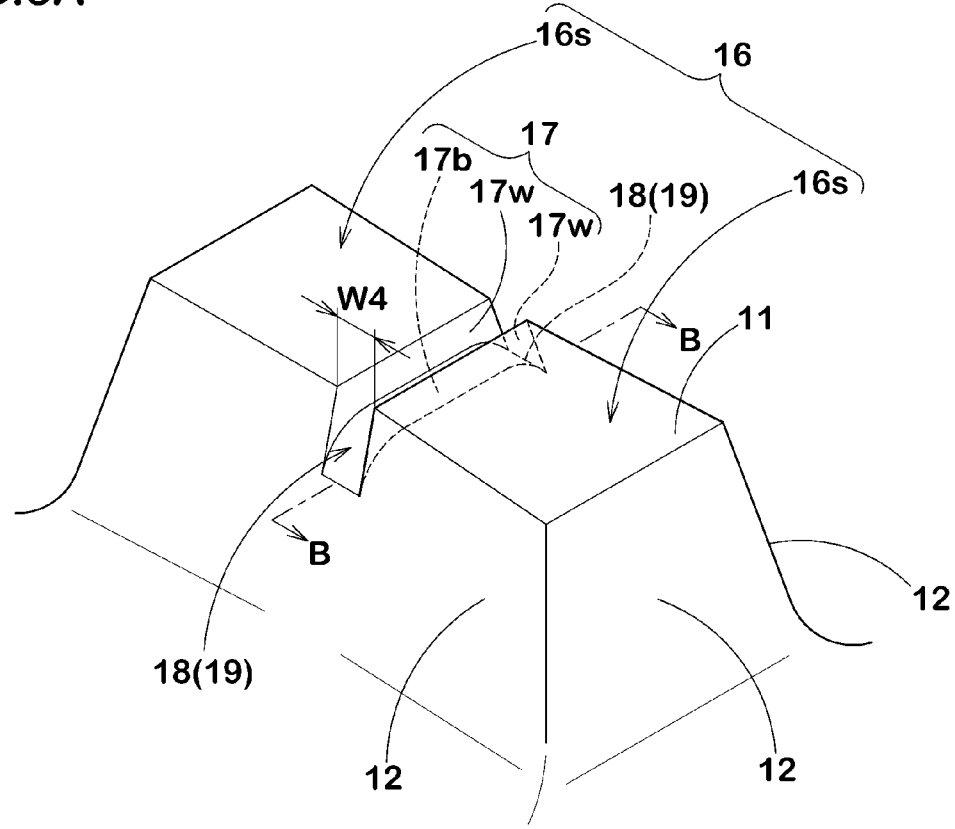
FIG. 3A is a perspective view of a shallowly-grooved block.
Figure 3B:
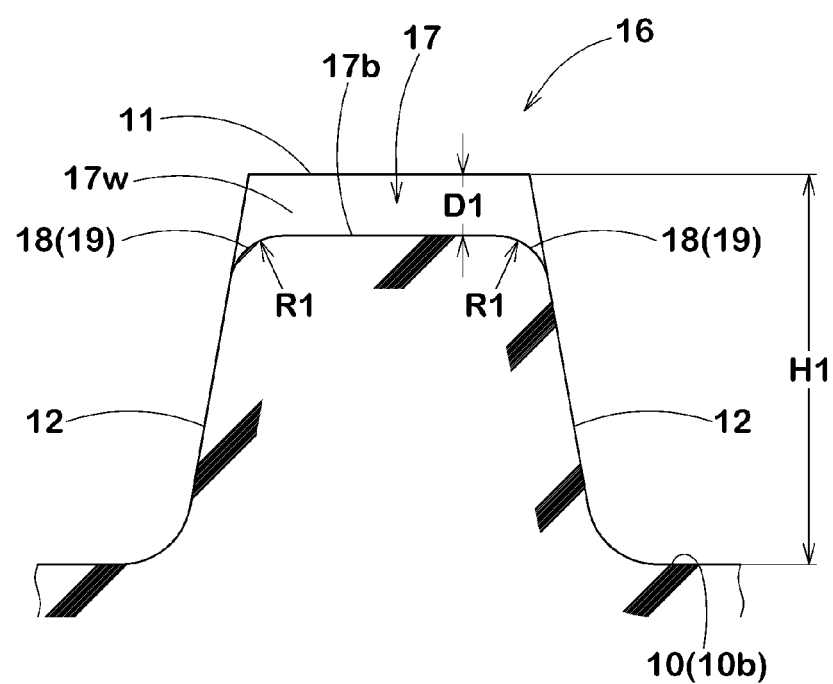
FIG. 3B is a cross sectional view taken on line B-B in FIG. 3A.

As shown in FIGS. 1, 3A and 3B, the blocks B include at least one shallowly-grooved block 16 in which the block is divided into at least two block segments 16s by providing a shallow groove 17 in a surface region of the block B. Preferably, one or more center blocks Bc are formed into the shallowly-grooved blocks 16. In this embodiment, all center blocks Bs are formed into the grooved blocks 16. Such a grooved center block Bs can enhance the road-hugging property and the ride comfortability in the straight running, since the shallowly-grooved block 16 has a relatively small rigidity.

In this embodiment, the shallowly-grooved block 16 has one shallow groove 17 extending in the tire circumferential direction at a center portion of the block in a width direction. This shallow groove 17 as shown in FIGS. 1, 3A and 3B has an angular cross sectional shape, e.g., a rectangular cross sectional shape, and has groove wall surfaces 17w, 17w extending radially inwardly from the tread surface 11 of the block B and a bottom 17b connecting the wall surfaces 17w, 17w. Such a shallow groove 17 serves to increase the edge of the block B.

It is preferable that the groove depth D1 of the shallow groove 17 is at least 10%, especially at least 20%, of the height H1 of the block B. If the groove depth D1 is too small, the edge of the block B cannot be increased so as to sufficiently improve the steering stability. On the other hand, if the groove depth D1 is too large, the rigidity of the block segment 16s is lowered, so the steering stability tends to be deteriorated. Therefore, it is preferable that the groove depth D1 of the shallow groove 17 is at most 50%, especially at most 40%, of the block height H1.

From the same viewpoints as above, the groove width W4 of the shallow groove 17 is preferably at least 1 mm, more preferably at least 2 mm, and is also preferably at most 7 mm, more preferably at most 5 mm.

In the shallowly-grooved block 16 in this embodiment, the both ends of the shallow groove 17 are opened on the outer wall surfaces 12, 12 of the shallowly-grooved block 16. Such a shallow groove 17 serves to accelerate water drainage and removal of mud on a hard or medium road.

Further, chamfered portions 19 having a convex circular arc-like curved surface are formed at intersection portions 18 between the bottom 17b of the shallow groove 17 and the outer wall surfaces 12 of the block 16. The chamfered portion 19 serves to scatter a strain which is apt to converge on the intersection portions 18 or the vicinity thereof due to deformation of the block associated with contact and non-contact to the ground, and it also serves to increase the rigidity of the intersection portions 18. Thus, the chamfered portion 19 serves to suppress generation of cracks at the intersection portions 18 or the vicinity thereof to which a strain is apt to converge. Furthermore, the chamfered portion 19 can efficiently introduce mud, sand or the like into and discharge it from the shallow groove 17, since the cross sectional area of the shallow groove 17 at the both ends thereof is increased, whereby the shallow groove 17 can ram down the introduced mud or sand at a center portion having a decreased cross sectional area to prevent the tire from sinking into a soft terrain, thus exhibiting an excellent floating performance.

It is preferable in effectively exhibiting the actions mentioned above that in a cross section, parallel to the longitudinal direction of the shallow groove 17, of the shallowly-grooved block 17 as shown in FIG. 3B, the chamfered portion 19 has a radius of curvature R1 of at least 1 mm, especially at least 5 mm, more especially at least 8 mm. If the radium of curvature R1 is to small, a strain generating around the intersection portion 18 cannot be sufficiently scattered, so the cracking resistance tends not to be enhanced. On the other hand, if the radius of curvature R1 is too large, the rigidity of the block segment 16s is decreased, so the steering stability tends to be deteriorated. Therefore, it is preferable that the radius of curvature R1 is at most 15 mm, especially at most 12 mm.

Figure 4A:
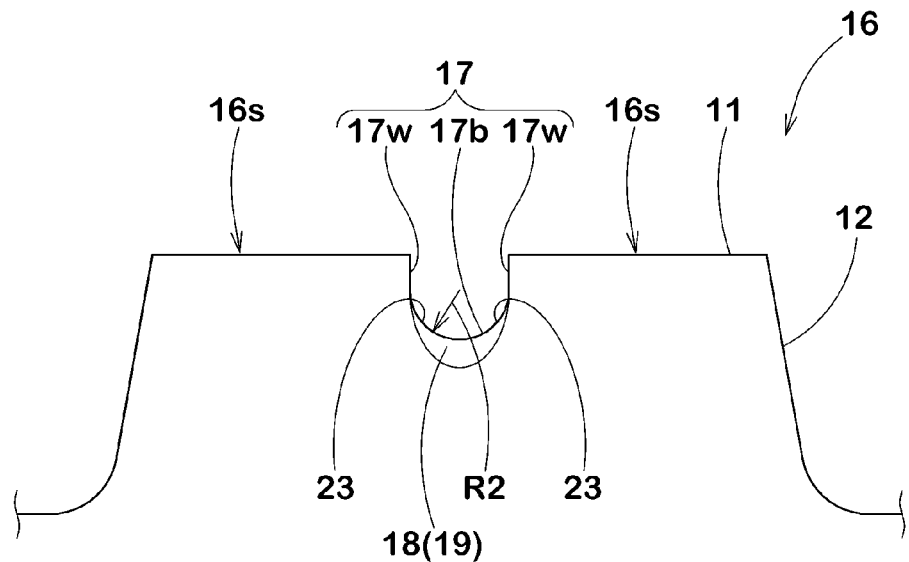
FIG. 4A is a front view of a shallowly-grooved block according to another embodiment of the present invention.

In FIG. 4A is shown another embodiment of the shallowly-grooved block 16 according to the present invention. The shallow groove 17 in this embodiment has a concave circular arc-like bottom 17b in a cross section perpendicular to the longitudinal direction of the groove 17. This groove bottom 17b has a single radius of curvature R2. Such a groove bottom 17b can effectively scatter a strain which is apt to converge to a corner portion 23 between the bottom 17b of the shallow groove 17 and a wall surface 17w of the groove 17 when the block 16 is deformed by repeated contact and non-contact to the ground.

It is preferable that the radius of curvature R2 of the groove bottom 17b is at least 0.5 mm, especially at least 2 mm. If the radius of curvature R2 is too small, the strain tends not to be effectively scattered. On the other hand, if the radius of curvature R2 is too large, the groove bottom 17b cannot be substantially formed into a concave circular arc-like shape, so the strain generating at the corner portion 23 tends not to be effectively scattered. Therefore, it is preferable that the radius of curvature R2 is at most 8 mm, especially at most 6 mm. The groove bottom 17b is not limited to a bottom having a single radius of curvature in the cross section thereof, but only the corner portions 23 may be formed into a concave circular arc-like shape or the bottom may have a plurality of radii of curvature in the cross section thereof.

Figure 4B:
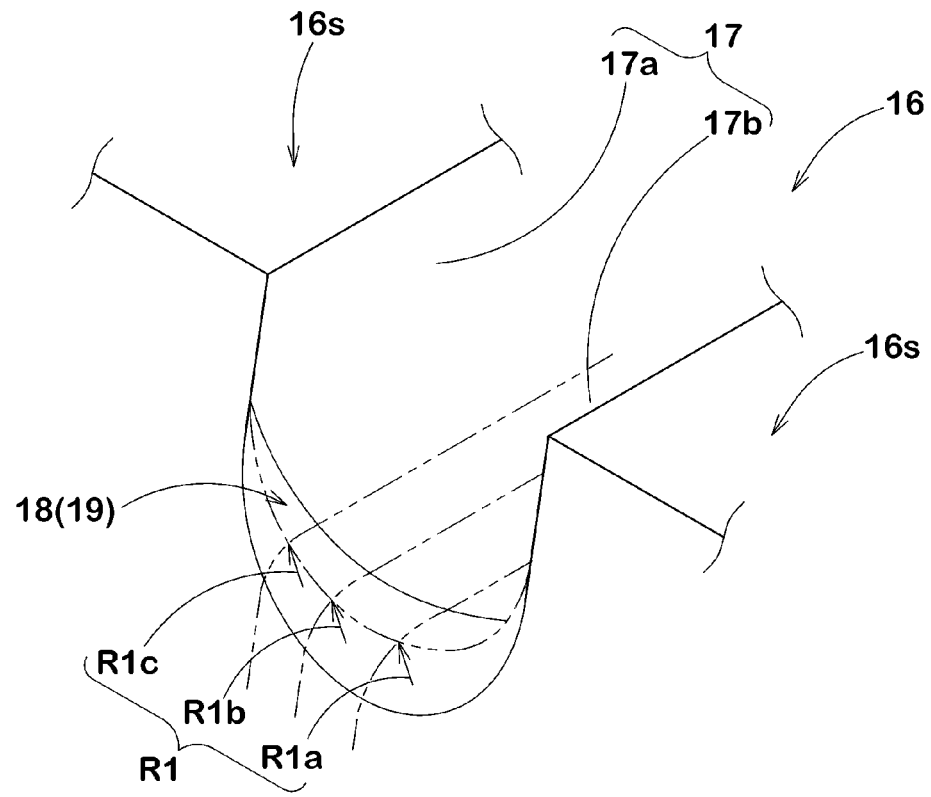
FIG. 4B is a partial perspective view of the block shown in FIG. 4A.

It is preferable that the chamfered portion 19 of the shallow groove 17 in this embodiment has a plurality of radii of curvature which gradually or stepwise decrease from a center side in the width direction toward the groove wall side, e.g., R1a>R1b>R1c as shown in FIG. 4B. Such a chamfered portion 19 can enhance the rigidity on a center portion which has a relatively small rigidity and to which a strain is apt to converge, to improve the cracking resistance. Moreover, it can prevent the rigidity of the block segments 16s which have a relatively large rigidity, from increasing excessively to enhance the road-hugging property of the tread surface and the ride comfortability.

Figure 5:
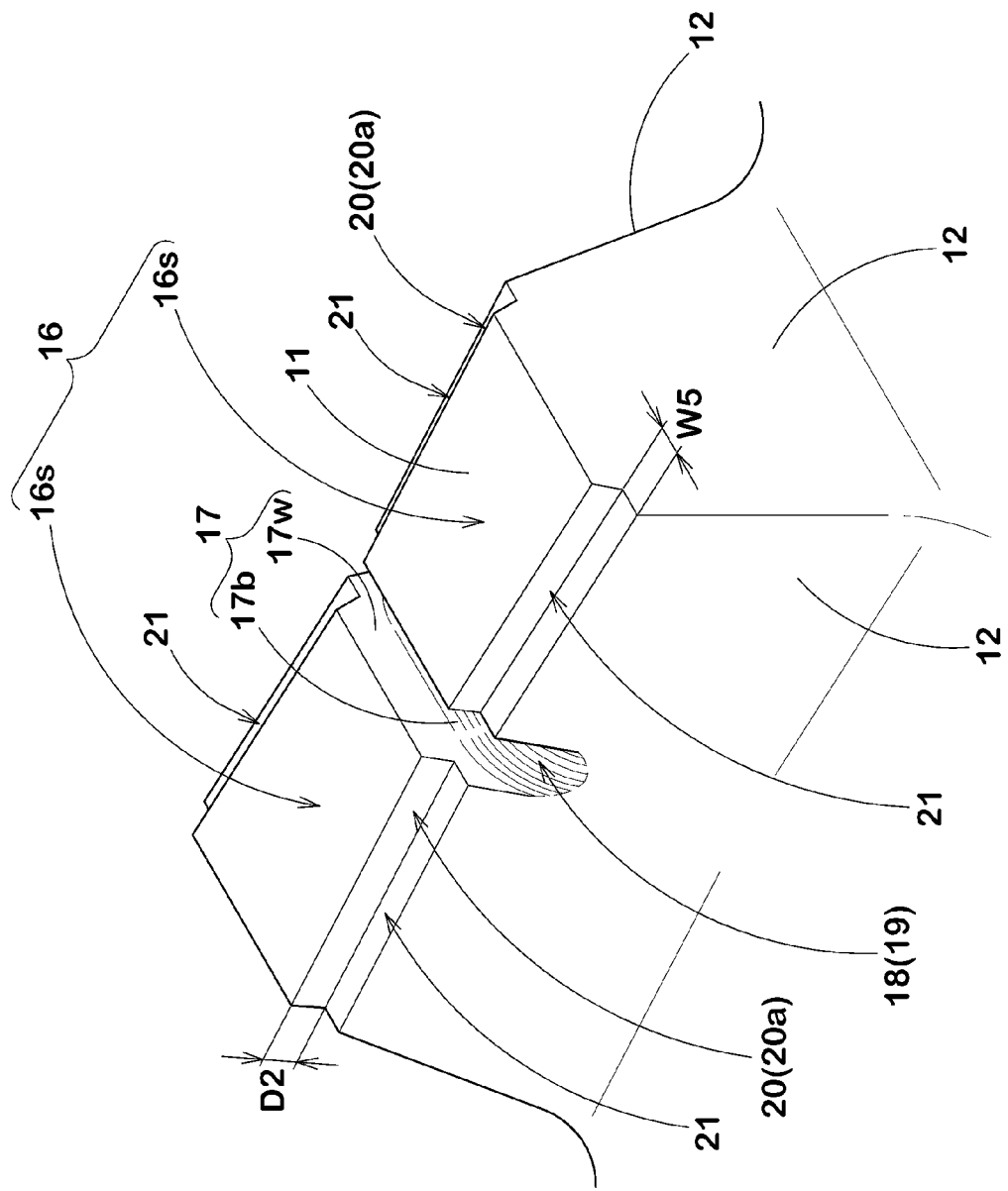
FIG. 5 is a perspective view of a shallowly-grooved block having a notched portion.

A still another embodiment of the shallowly-grooved block 16 according to the present invention is shown in FIG. 5. The shallowly-grooved block 16 in this embodiment has a notched portion 21 such that at least a part of an intersection portion 20 between the tread surface 11 and the block wall surfaces 12, in other words, at least a part of a profile line (peripheral edge) of the tread surface 11, is cut away. The notched portion 21 shown in FIG. 5 is formed by cutting away an entire region of intersection portions 20 extending in a direction intersecting with the shallow groove 17 in each block segment 16s, into a reentrant shape.

Such a notched portion 21 supplements an edge reduced by formation of chamfered portion 19 to enhance friction with a road. Furthermore, since the edge on the tread surface 11 side which has a larger influence on the steering stability, is increased, the notched portion 21 can further enhance the steering stability. In addition, since the notched portion 21 in this embodiment extends in a direction intersecting with the shallow groove 17, the rigidity of each block segment 16s which has been enhanced by the formation of chamfered portion 19, can be eased with reduction of rubber volume to enhance the road-hugging property and the ride comfortability. Further, since the edge component in the axial direction of tire is increased, the notched portion 21 can enhance the straight running stability.

It is preferable that in the cross section of the notched portion 21 perpendicular to the longitudinal direction thereof, the cutaway depth D2 of the notched portion 21 is at least 1 mm, especially at least 2 mm. If the cutaway depth D2 is too small, the effects as mentioned above tend to be sufficiently obtained. On the other hand, if the cutaway depth D2 is too large, there is a possibility that the rigidity of the block segment 16s is excessively decreased to deteriorate the steering stability. From such a point of view, it is preferable that the cutaway depth D2 is at most 6 mm, especially at most 4 mm.

From the same viewpoints as above, it is preferable that in the cross section of the notched portion 21 perpendicular to the longitudinal direction thereof, the cutaway width W5 of the notched portion 21 is at least 1 mm, especially at least 2 mm, and it is at most 6 mm, especially at most 4 mm.

Figure 6:
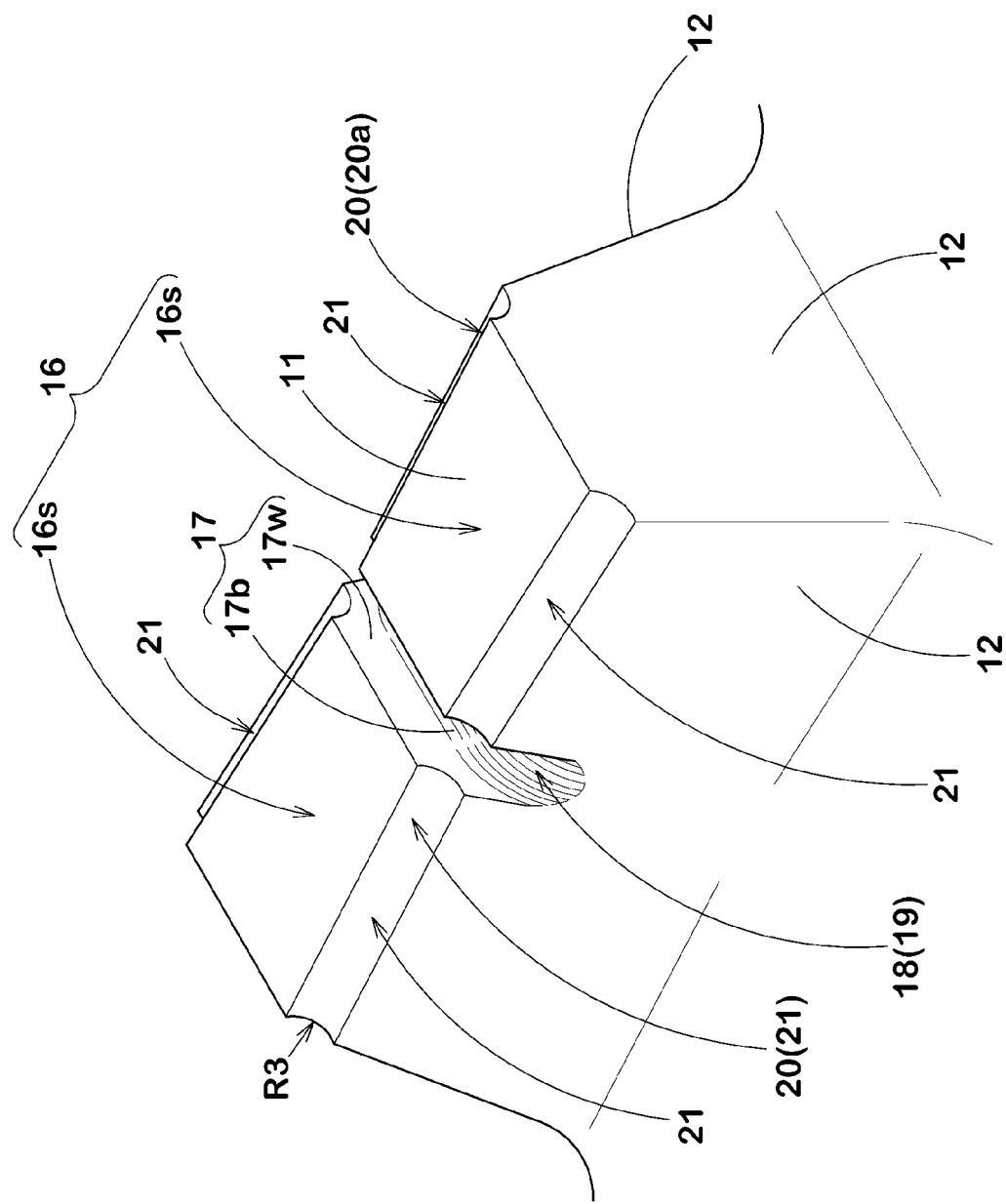
FIG. 6 is a perspective view of a shallowly-grooved block having a notched portion according to another embodiment of the present invention.

As shown in FIG. 6, the notched portion 21 may be formed into a concave circular arc-like shape in a cross section perpendicular to the longitudinal direction of the notched portion 21. As compared with the embodiment for the angular notched portion as shown in FIG. 5, the arc-like notched portion 21 can more effectively scatter a strain acting on the intersection portion 20 and, therefore, it can further enhance the cracking resistance.

It is preferable that in the cross section of the notched portion 21 perpendicular to the longitudinal direction thereof, the concave circular arc-like notched portion 21 has a radius of curvature R3 of at least 1 mm, especially at least 2 mm. If the radius of curvature R3 is too small, there is a possibility that the edge effects are not sufficiently exhibited. On the other hand, if the radius of curvature R4 is too large, there is a possibility that a strain generating inside the notched portion 21 is not sufficiently scattered. Therefore, it is preferable that the radius of curvature R3 is at most 8 mm, especially at most 6 mm.

Figure 7A:
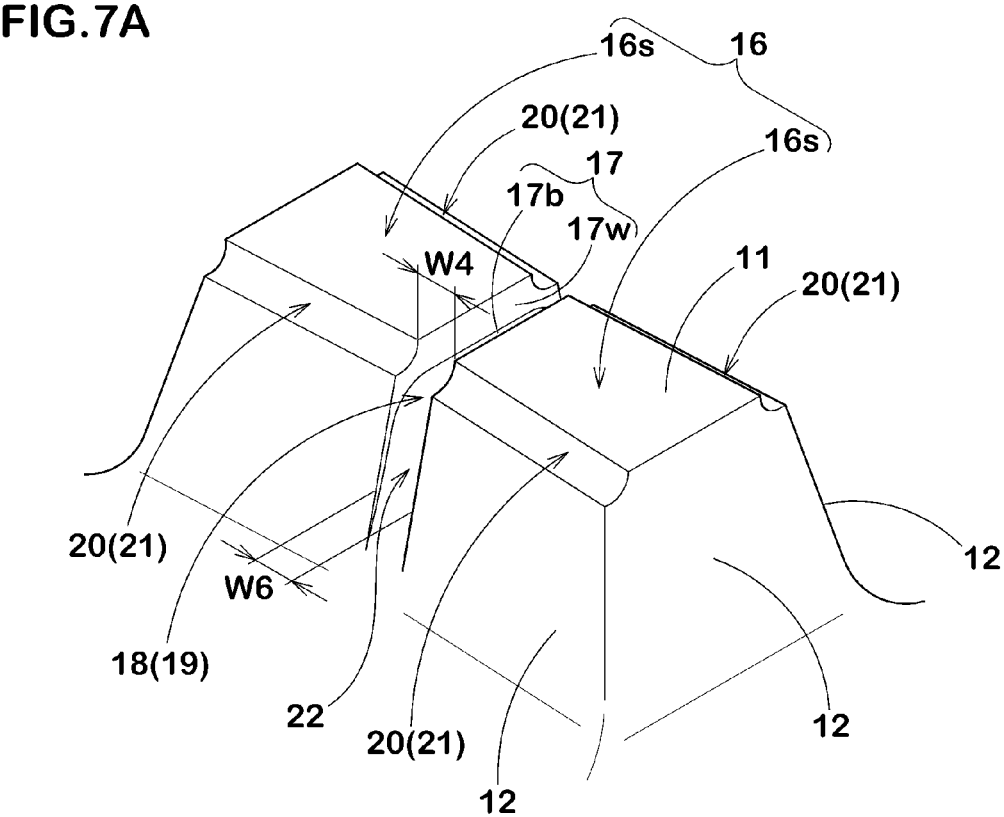
FIG. 7A is a perspective view of a shallowly-grooved block according to still another embodiment of the present invention.
Figure 7B:
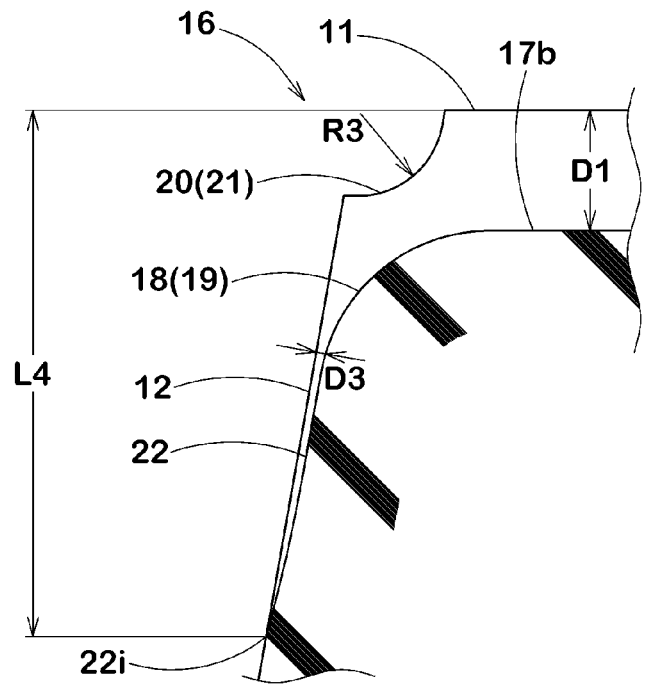
FIG. 7B is a partial cross sectional view of the block shown in FIG. 7A.

In FIGS. 7A and 7B is shown a still another embodiment of the shallowly-grooved block 16 according to the present invention, wherein the outer wall surface 12 of the shallowly-grooved block 16 has a recessed surface 22 which extends radially inwardly from the chamfered portion 19 and which is recessed toward a center of the block 16. The recessed surface 22 shown in the drawings extends radially inwardly with keeping a recess width W6 same as the groove width W4 of the shallow groove 17. Since edges extending in a vertical direction are formed on the block wall surface 12, such a recessed surface 22 can enhance the steering stability. Further, since the rubber volume is decreased at both end sides of the shallow groove 17, the recess surface 22 acts to ease the block rigidity which has been increased by the formation of the chamfered portion 19.

Preferably, the recess surface 22 is formed so that, as shown in FIG. 7B, it extends radially inwardly from the chamfered portion 19 with gradually decreasing depth D3 of the recess, whereby reduction of the rubber volume on the tread groove bottom 10b side of the shallowly-grooved block 16 is minimized to maintain the cracking resistance while increasing the edge component on the tread surface 11 side which has a relatively large influence on the steering stability. The recessed surface 22 may terminate at the block wall surface 12 or may extend up to the bottom of the block 17, in other words, the bottom of the tread groove 10.

It is preferable that a radial length L4 of the recessed surface 22 between its radially inner end 22i and the tread surface 11 is at least 50%, especially at least 60%, of the block height H1 (shown in FIG. 3B). If the length L4 is too small, the effects mentioned above tend not to be sufficiently exhibited. On the other hand, if the length L4 is too large, there is a possibility that the rubber volume is excessively decreased to lower the rigidity of the block segment 16s. Therefore, the length L4 is preferably at most 95%, more preferably at most 85%, of the block height H1.

From the same viewpoints as above, it is preferable that the maximum depth D3 of the recessed surface 22 measured in a direction perpendicular to the block wall surface 12 is at least 0.5 mm, especially at least 0.75 mm, and it is at most 2.0 mm, especially at most 1.5 mm.

The recessed surface 22 may have a recess width W6 gradually decreasing in a radially inward direction. Such a recessed surface 22 increases the edge component with minimizing reduction of the rubber volume of the block wall surface 12 to secure the block rigidity.

Further, the recessed surface 22 may be a curved surface in the form of a concave circular arc. Such a curved surface 22 can scatter a strain generating at the recessed surface 22 to enhance the cracking resistance.

It is preferable that the shallowly-grooved block 16 has an approximately butterfly-like or wing-like tread surface 11 as shown in FIG. 2, when viewed from above, such that the circumferential length L1 of the tread surface 11 is gradually reduced in a direction from both axially outer sides toward an axially inner side of the tread surface 11. The shallowly-grooved block 16 having such a tread surface can efficiently lead mud, sand or the like into the shallow groove 17, as compared with a conventional block, thus further enhancing the floating performance. Since both axially outer side portions of the tread surface 11 come into contact with the ground in advance of an axially inner side portion of the tread surface 11, a strain generating at the intersection portion 18 is suppressed to enhance the cracking resistance.

While preferable embodiments of the present invention have been described with reference to the drawings, it goes without saying that the present invention is not limited to only such embodiments and various changes and modifications may be made.

The present invention is more specifically described and explained by means of the following examples and comparative examples. It is to be understood that the present invention is not limited to these examples.

EXAMPLES 1 TO 21 AND COMPARATIVE EXAMPLES 1 TO 3

Off-road tires for front and rear wheels of motorcycle having a basic structure shown in FIG. 1 and having a shallow-grooved block shown in Table 1 were manufactured and tested.

Figure 8:
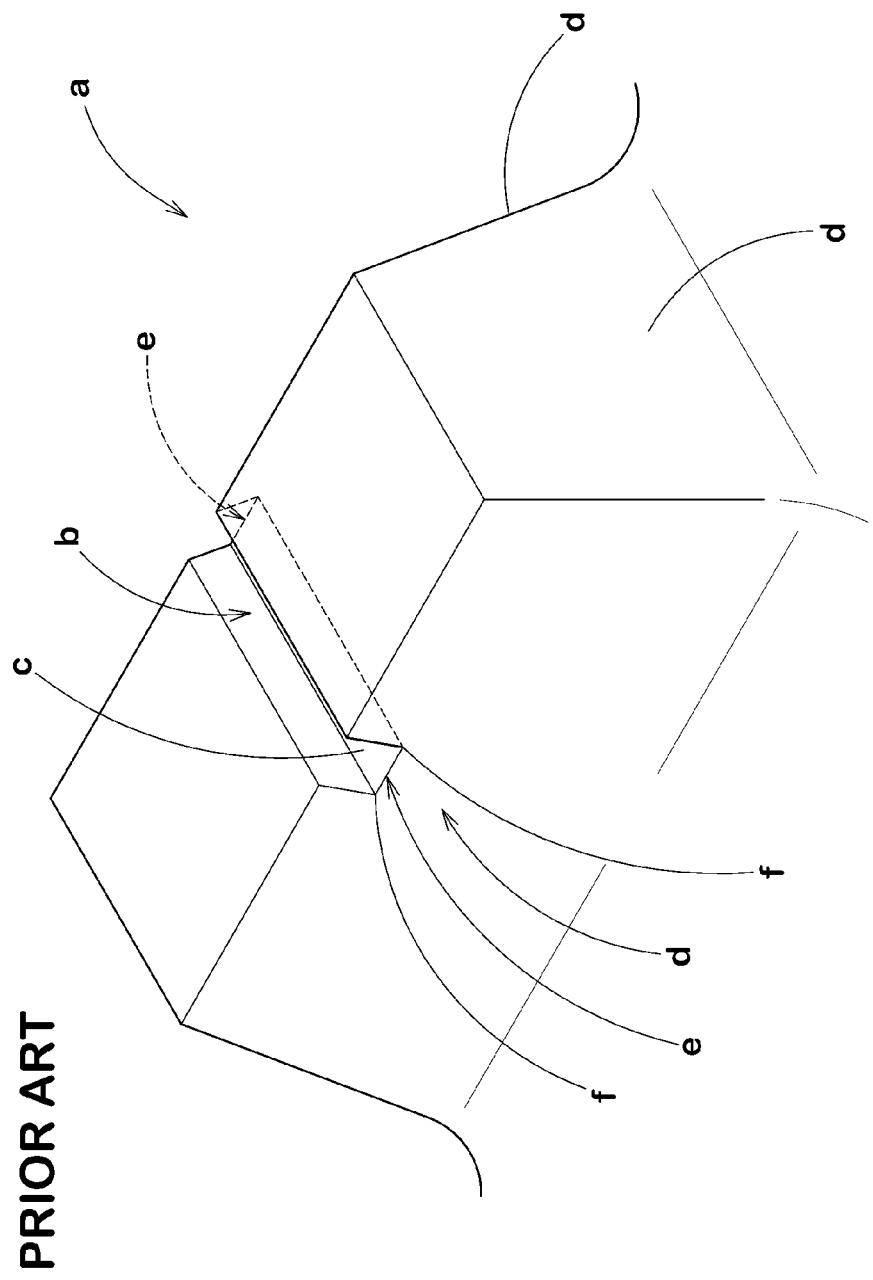
FIG. 8 is a perspective view illustrating an example of a conventional block.

Further, for comparison, off-road motorcycle tires having conventional blocks in which no chamfered portion was formed in the shallow groove as shown in FIG. 8, were manufactured and tested in the same manner as above (Comparative Examples 1 to 3).

Specifications of the tires common to all tires are as follows:

Tire size: Front wheel 90/100-21
   Rear wheel 120/80-19
Rim size: Front wheel 1.60×21
   Rear wheel 2.15×19
Tread width TW: 145 mm
Tread-developed width TWe: 175 mm
Land ratio Sb/S: 25%
Hardness of blocks: 75
Height Hi of blocks: 16 mm
Center blocks:
   Width W1: 45 mm
   Circumferential length L1: 20 mm
   Ratio W1/TWe: 25.7%
   Ratio L1/W1: 44.4%
Shoulder blocks:
   Width W2: 15 mm
   Circumferential length L2: 25 mm
   Ratio W2/TWe: 8.6%
   Ratio L2/W2: 166.7%
Middle blocks:
   Width W3: 20 mm
   Circumferential length L3: 22 mm
   Ratio W3/TWe: 11.4%
   Ratio L3/W3: 110%

The performances of the tires were evaluated by the methods described below.

<Cracking Resistance>

Each tire was attached to the wheels, inflated up to an inner pressure of 80 kPa for both the front and rear wheels, and attached to of a 450 cc motorcycle. The motorcycle was run on an off-road test course for 30 minutes. The number of cracks generating at the chamfered portion of the shallowly-grooved blocks was visually counted. The inverse of the number of cracks is represented as an index to the result of Comparative Example 1 regarded as 100. The larger the value, the less the cracks and, therefore, the better the cracking resistance.

<Steering Stability, Floating Stability>

The motorcycle mentioned above was run on an off-road test course by a professional test driver, and the steering stability and the floating performance during cornering were evaluated by driver's feeling.

The results are shown by an index to the result of Comparative Example 1 regarded as 100. The larger the value, the better the performances.

The test results are shown in Table 1.

It is observed in Table 1 that the tires of the Examples according to the present invention exhibit enhanced cracking resistance and floating performance.

TABLE 1

|  | Com. Ex. 1 | Com. Ex. 2 | Com. Ex. 3 | Ex. 1 | Ex. 2 | Ex. 3 |
| --- | --- | --- | --- | --- | --- | --- |
| Shallowly-grooved block |  |  |  |  |  |  |
| Drawing showing shallowly-grooved block | FIG. 8 | FIG. 8 | FIG. 8 | FIG. 3A | FIG. 3A | FIG. 3A |
| Groove depth D1 (mm) | 5 | 5 | 8 | 5 | 5 | 5 |
| Ratio D1/H1 (%) | 31.3 | 31.3 | 50 | 31.3 | 31.3 | 31.3 |
| Groove width W4 (mm) | 3 | 5 | 3 | 3 | 3 | 3 |
| Radius of curvature R1 of chamfered portion (mm) | — | — | — | 1 | 3 | 5 |
| Radius of curvature R1a of chamfered portion (mm) | — | — | — | — | — | — |
| Radius of curvature R1b of chamfered portion (mm) | — | — | — | — | — | — |
| Radius of curvature R1c of chamfered portion (mm) | — | — | — | — | — | — |
| Radius of curvature R2 of bottom surface (mm) | — | — | — | — | — | — |
| Notched portion |  |  |  |  |  |  |
| Cutaway depth D2 (mm) | — | — | — | — | — | — |
| Cutaway width W5 (mm) | — | — | — | — | — | — |
| Radius of curvature R3 of notched portion (mm) | — | — | — | — | — | — |
| Recessed surface |  |  |  |  |  |  |
| Radial length L4 of recessed surface between its inner end and tread surface (mm) | — | — | — | — | — | — |
| Ratio L4/H1 (%) | — | — | — | — | — | — |
| Maximum depth D3 (mm) | — | — | — | — | — | — |
| Cracking resistance (index) | 100 | 90 | 90 | 105 | 110 | 115 |
| Steering stability (index) | 100 | 90 | 80 | 100 | 110 | 110 |
| Floating performance (index) | 100 | 110 | 90 | 105 | 110 | 115 |

|  | Ex. 4 | Ex. 5 | Ex. 6 | Ex. 7 | Ex. 8 | Ex. 9 |
| --- | --- | --- | --- | --- | --- | --- |
| Shallowly-grooved block |  |  |  |  |  |  |
| Drawing showing shallowly-grooved block | FIG. 3A | FIG. 3A | FIG. 3A | FIG. 4B | FIG. 4B | FIG. 5 |
| Groove depth D1 (mm) | 5 | 5 | 5 | 5 | 5 | 5 |
| Ratio D1/H1 (%) | 31.3 | 31.3 | 31.3 | 31.3 | 31.3 | 31.3 |
| Groove width W4 (mm) | 3 | 3 | 3 | 3 | 3 | 3 |

TABLE 1-continued

|  | | | | | | |
|---|---|---|---|---|---|---|
| Radius of curvature R1 of chamfered portion (mm) | 10 | 15 | — | — | — | — |
| Radius of curvature R1a of chamfered portion (mm) | — | — | 10 | 10 | 10 | 10 |
| Radius of curvature R1b of chamfered portion (mm) | — | — | 8 | 8 | 8 | 8 |
| Radius of curvature R1c of chamfered portion (mm) | — | — | 6 | 6 | 6 | 6 |
| Radius of curvature R2 of bottom surface (mm) | — | — | 2 | 0.5 | 8 | 2 |
| Notched portion | | | | | | |
| Cutaway depth D2 (mm) | — | — | — | — | — | 3 |
| Cutaway width W5 (mm) | — | — | — | — | — | 3 |
| Radius of curvature R3 of notched portion (mm) | — | — | — | — | — | — |
| Recessed surface | | | | | | |
| Radial length L4 of recessed surface between its inner end and tread surface (mm) | — | — | — | — | — | — |
| Ratio L4/H1 (%) | — | — | — | — | — | — |
| Maximum depth D3 (mm) | — | — | — | — | — | — |
| Cracking resistance (index) | 120 | 130 | 120 | 115 | 125 | 110 |
| Steering stability (index) | 115 | 100 | 110 | 110 | 105 | 120 |
| Floating performance (index) | 120 | 125 | 120 | 115 | 130 | 110 |

|  | Ex. 10 | Ex. 11 | Ex. 12 | Ex. 13 | Ex. 14 | Ex. 15 |
|---|---|---|---|---|---|---|
| Shallowly-grooved block | | | | | | |
| Drawing showing shallowly-grooved block | FIG. 5 | FIG. 5 | FIG. 5 | FIG. 5 | FIG. 6 | FIG. 6 |
| Groove depth D1 (mm) | 5 | 5 | 5 | 5 | 5 | 5 |
| Ratio D1/H1 (%) | 31.3 | 31.3 | 31.3 | 31.3 | 31.3 | 31.3 |
| Groove width W4 (mm) | 3 | 3 | 3 | 3 | 3 | 3 |
| Radius of curvature R1 of chamfered portion (mm) | — | — | — | — | — | — |
| Radius of curvature R1a of chamfered portion (mm) | 10 | 10 | 10 | 10 | 10 | 10 |
| Radius of curvature R1b of chamfered portion (mm) | 8 | 8 | 8 | 8 | 8 | 8 |
| Radius of curvature R1c of chamfered portion (mm) | 6 | 6 | 6 | 6 | 6 | 6 |
| Radius of curvature R2 of bottom surface (mm) | 2 | 2 | 2 | 2 | 2 | 2 |
| Notched portion | | | | | | |
| Cutaway depth D2 (mm) | 1 | 6 | 3 | 3 | — | — |
| Cutaway width W5 (mm) | 3 | 3 | 1 | 6 | — | — |
| Radius of curvature R3 of notched portion (mm) | — | — | — | — | 3 | 1 |
| Recessed surface | | | | | | |
| Radial length L4 of recessed surface between its inner end and tread surface (mm) | — | — | — | — | — | — |
| Ratio L4/H1 (%) | — | — | — | — | — | — |
| Maximum depth D3 (mm) | — | — | — | — | — | — |
| Cracking resistance (index) | 115 | 105 | 115 | 105 | 110 | 120 |
| Steering stability (index) | 110 | 115 | 110 | 105 | 120 | 110 |
| Floating performance (index) | 120 | 110 | 120 | 110 | 110 | 120 |

|  | Ex. 16 | Ex. 17 | Ex. 18 | Ex. 19 | Ex. 20 | Ex. 21 |
|---|---|---|---|---|---|---|
| Shallowly-grooved block | | | | | | |
| Drawing showing shallowly-grooved block | FIG. 6 | FIG. 7A | FIG. 7A | FIG. 7A | FIG. 7A | FIG. 7A |
| Groove depth D1 (mm) | 5 | 5 | 5 | 5 | 5 | 5 |
| Ratio D1/H1 (%) | 31.3 | 31.3 | 31.3 | 31.3 | 31.3 | 31.3 |
| Groove width W4 (mm) | 3 | 3 | 3 | 3 | 3 | 3 |
| Radius of curvature R1 of chamfered portion (mm) | — | 5 | 5 | 5 | 5 | 5 |
| Radius of curvature R1a of chamfered portion (mm) | 10 | — | — | — | — | — |
| Radius of curvature R1b of chamfered portion (mm) | 8 | — | — | — | — | — |
| Radius of curvature R1c of chamfered portion (mm) | 6 | — | — | — | — | — |
| Radius of curvature R2 of bottom surface (mm) | 2 | — | — | — | — | — |
| Notched portion | | | | | | |
| Cutaway depth D2 (mm) | — | — | — | — | — | — |
| Cutaway width W5 (mm) | — | — | — | — | — | — |
| Radius of curvature R3 of notched portion (mm) | 8 | 3 | 3 | 3 | 3 | 3 |
| Recessed surface | | | | | | |
| Radial length L4 of recessed surface between its inner end and tread surface (mm) | — | 12 | 2 | 14 | 12 | 12 |
| Ratio L4/H1 (%) | — | 75 | 12.5 | 87.5 | 75 | 75 |
| Maximum depth D3 (mm) | — | 1.0 | 1.0 | 1.0 | 0.5 | 2.0 |
| Cracking resistance (index) | 105 | 110 | 110 | 105 | 110 | 105 |
| Steering stability (index) | 105 | 130 | 120 | 125 | 120 | 125 |
| Floating performance (index) | 105 | 110 | 110 | 105 | 110 | 105 |

What is claimed is:

1. An off-road motorcycle tire comprising a tread portion having a plurality of blocks defined by tread grooves, wherein:
   at least one of said blocks has a shallow groove having a groove depth of 10 to 50% of a height of said blocks to provide a shallowly-grooved block in which the block is divided into at least two block segments by said shallow groove,
   said shallow groove having both ends opened on outer wall surfaces of said shallowly-grooved block, groove wall surfaces extending radially inwardly from a tread surface of the block which comes into contact with a road, and a bottom connecting said groove wall surfaces, and
   intersection portions between said bottom and said outer wall surfaces are chamfered to form chamfered portions having a convex arc-like curved surface,
   wherein said shallowly-grooved block is provided with a notched portion which is formed in at least a part of an intersection portion between the thread surface and the outer wall surfaces and which extends along a profile line of a tread surface.

2. The motorcycle tire of claim 1, wherein said chamfered portions have a radius of curvature of 1 to 15 mm.

3. The motorcycle tire of claim 1, wherein said notched portion extends in a direction intersecting with the shallow groove.

4. The motorcycle tire of claim 1, wherein the notched portion is in the form of a concave circular arc having a radius of curvature of 1 to 8 mm in a cross section perpendicular to a longitudinal direction of the notched portion.

5. The motorcycle tire of claim 1, wherein the tread surface of the shallowly-grooved block is in the form of a horizontally long rectangle, when viewed from above, such that its axial width is larger than its circumferential length, and the shallow groove extends in the tire circumferential direction at a center portion of the block in a width direction.

6. The motorcycle tire of claim 5, wherein said tread surface is in an approximately butterfly-like form, when viewed from above, such that the circumferential length of the tread surface is gradually reduced in a direction from both axially outer sides toward an axially inner side of the tread surface.

7. An off-road motorcycle tire comprising a tread portion having a plurality of blocks defined by tread grooves, wherein:
   at least one of said blocks has a shallow groove having a groove depth of 10 to 50% of a height of said blocks to provide a shallowly-grooved block in which the block is divided into at least two block segments by said shallow groove,
   said shallow groove having both ends opened on outer wall surfaces of said shallowly-grooved block, groove wall surfaces extending radially inwardly from a tread surface of the block which comes into contact with a road, and a bottom connecting said groove wall surfaces, and
   intersection portions between said bottom and said outer wall surfaces are chamfered to form chamfered portions having a convex circular arc-like curved surface,
   wherein the outer wall surface of the shallowly-grooved block has a recessed surface which extends radially inwardly from the chamfered portion and which is recessed toward a center of the block.

8. The motorcycle tire of claim 7, wherein said chamfered portions have a radius of curvature of 1 to 15 mm.

9. The motorcycle tire of claim 7, wherein the tread surface of the shallowly-grooved block is in the form of a horizontally long rectangle, when viewed from above, such that its axial width is larger than its circumferential length, and
   wherein the shallow groove extends in the tire circumferential direction at a center portion of the block in a width direction.

10. The motorcycle tire of claim 9, wherein said tread surface is in an approximately butterfly-like form, when viewed from above, such that the circumferential length of the tread surface is gradually reduced in a direction from both axially outer sides toward an axially inner side of the tread surface.

* * * * *